United States Patent
Liu et al.

(10) Patent No.: US 8,391,539 B2
(45) Date of Patent: Mar. 5, 2013

(54) DAMPER AND LOUDSPEAKER USING THE SAME

(75) Inventors: Liang Liu, Beijing (CN); Jia-Ping Wang, Beijing (CN)

(73) Assignees: Tsinghua University, Beijing (CN); Hon Hai Precision Industry Co., Ltd., New Taipei (TW)

( * ) Notice: Subject to any disclaimer, the term of this patent is extended or adjusted under 35 U.S.C. 154(b) by 283 days.

(21) Appl. No.: 12/824,399

(22) Filed: Jun. 28, 2010

(65) Prior Publication Data

US 2011/0064259 A1  Mar. 17, 2011

(30) Foreign Application Priority Data

Sep. 15, 2009 (CN) .......................... 2009 1 0190211

(51) Int. Cl.
*H04R 1/00* (2006.01)
*H04R 9/06* (2006.01)
*H04R 11/02* (2006.01)

(52) U.S. Cl. .................. 381/413; 977/742; 977/949

(58) Field of Classification Search .......... 977/742, 977/902, 949; 381/394, 413, 423
See application file for complete search history.

(56) References Cited

U.S. PATENT DOCUMENTS

| | | | |
|---|---|---|---|
| 4,312,118 A | 1/1982 | Saik et al. | |
| 6,597,798 B1 * | 7/2003 | Nakazono et al. | 381/410 |
| 6,639,993 B2 * | 10/2003 | Kemmerer et al. | 381/397 |
| 6,808,746 B1 | 10/2004 | Dai et al. | |
| 7,045,108 B2 | 5/2006 | Jiang et al. | |
| 7,437,938 B2 | 10/2008 | Chakraborty | |
| 8,068,626 B2 * | 11/2011 | Jiang et al. | 381/164 |
| 8,073,164 B2 * | 12/2011 | Jiang et al. | 381/164 |
| 2004/0020681 A1 | 2/2004 | Hjortstarn et al. | |
| 2004/0053780 A1 | 3/2004 | Jiang et al. | |
| 2007/0166223 A1 | 7/2007 | Jiang et al. | |
| 2008/0248235 A1 | 10/2008 | Feng et al. | |
| 2008/0260188 A1 * | 10/2008 | Kim | 381/190 |
| 2008/0299031 A1 | 12/2008 | Liu et al. | |
| 2008/0304694 A1 | 12/2008 | Hayashi | |
| 2009/0045005 A1 * | 2/2009 | Byon et al. | 181/167 |
| 2009/0068448 A1 | 3/2009 | Liu et al. | |
| 2009/0074228 A1 | 3/2009 | Mango, III et al. | |
| 2009/0153502 A1 | 6/2009 | Jiang et al. | |

(Continued)

FOREIGN PATENT DOCUMENTS

| CN | 2282253 | 5/1998 |
|---|---|---|
| CN | 1270488 | 10/2000 |

(Continued)

OTHER PUBLICATIONS

"Flexible, Stretchable, Transparent Carbon Nanotube Thin Film Loudspeakers" Lin Xiao et al. Nano Letters, Oct. 29, 2008.*

(Continued)

*Primary Examiner* — Jeffrey Donels
(74) *Attorney, Agent, or Firm* — Altis Law Group, Inc.

(57) ABSTRACT

A damper includes at least one matrix and at least one carbon nanotube structure disposed on at least one surface of the at least one matrix. A loudspeaker using the damper is also disclosed. The loudspeaker includes a frame, a diaphragm secured on the frame, a bobbin having a voice coil, and a damper. The bobbin is secured to the diaphragm. The damper has a first engaging surface engaged with the frame and a second engaging surface engaged with the bobbin.

20 Claims, 14 Drawing Sheets

U.S. PATENT DOCUMENTS

| | | |
|---|---|---|
| 2009/0155467 A1 | 6/2009 | Wang et al. |
| 2009/0160799 A1 | 6/2009 | Jiang et al. |
| 2009/0197082 A1 | 8/2009 | Jiang et al. |
| 2009/0220767 A1 | 9/2009 | Schlögl et al. |
| 2009/0268559 A1* | 10/2009 | Jiang et al. ............ 367/140 |
| 2009/0272935 A1 | 11/2009 | Hata et al. |
| 2009/0296528 A1* | 12/2009 | Jiang et al. ............ 367/140 |
| 2010/0046784 A1* | 2/2010 | Jiang et al. ............ 381/386 |
| 2010/0188934 A1* | 7/2010 | Qian et al. ............ 367/140 |

FOREIGN PATENT DOCUMENTS

| | | |
|---|---|---|
| CN | 2488247 | 4/2002 |
| CN | 1430785 | 7/2003 |
| CN | 2583909 | 10/2003 |
| CN | 1640923 | 7/2005 |
| CN | 101239712 | 8/2008 |
| CN | 101288336 | 10/2008 |
| CN | 101304945 | 11/2008 |
| CN | 101321410 | 12/2008 |
| CN | 101381071 | 3/2009 |
| CN | 101464759 | 6/2009 |
| CN | 101499328 | 8/2009 |
| JP | 60-27298 | 2/1985 |
| JP | 63-49991 | 12/1988 |
| JP | 7-138838 | 5/1995 |
| JP | 2002-171593 | 6/2002 |
| JP | 2002-542136 | 12/2002 |
| JP | 2003-319490 | 11/2003 |
| JP | 2004-32425 | 1/2004 |
| JP | 2004-107196 | 4/2004 |
| JP | 2006-147801 | 6/2006 |
| JP | 2007-182352 | 7/2007 |
| JP | 2007-290908 | 11/2007 |
| JP | 2009-144158 | 7/2009 |
| JP | 2009-146420 | 7/2009 |
| JP | 2009-184910 | 8/2009 |
| WO | WO2007015710 | 2/2007 |

OTHER PUBLICATIONS

"Nanotubes made of carbon find an unexpected use." The Economist, Nov. 20, 2008.*

"Hot nanotube sheets produce music on demand." New Scientist, Oct. 31, 2008.*

Xiao et al.,Flexible, Stretchable, Transparent Carbon Nanotube Thin Film Loudspeakers,Nanoletter, vol. 8; No. 12, 4539-4545.

* cited by examiner

DAMPER AND LOUDSPEAKER USING THE SAME

CROSS-REFERENCE TO RELATED APPLICATIONS

This application claims all benefits accruing under 35 U.S.C. §119 from China Patent Application No. 200910190211.5, filed on Sep. 15, 2009, in the China Intellectual Property Office, the disclosure of which is incorporated herein by reference.

BACKGROUND

1. Technical Field

The present disclosure relates to a damper based on carbon nanotubes, and a loudspeaker using the same.

2. Description of Related Art

A loudspeaker is an acoustic device transforming received electric signals into sounds. The electric signals have enough power to make the sounds audible to humans. There are different types of loudspeakers that can be categorized by their working principle, such as electro-dynamic loudspeakers, electromagnetic loudspeakers, electrostatic loudspeakers, and piezoelectric loudspeakers. Among the various types, electro-dynamic loudspeakers have simple structures, good sound quality, and low cost, thus it is most widely used.

Electro-dynamic loudspeakers typically include a diaphragm, a bobbin, a voice coil, a damper, a magnet, and a frame. The voice coil is an electrical conductor placed in the magnetic field of the magnet. By applying an electrical current to the voice coil, a mechanical vibration of the diaphragm is produced due to the interaction between the electromagnetic field produced by the voice coil and the magnetic field of the magnets, to produce sound waves.

The damper can support the voice coil so that the voice coil can move up and down without moving laterally. Also, the damper can slow the vibration of the diaphragm and protect the diaphragm from being damaged. However, the material of the damper is usually polymer, metal, or non-carbon nanotube paper, and therefore has relatively low strength in the radial or lateral direction, low elasticity in the axial direction, and low endurance strength.

What is needed, therefore, is to provide a damper with improved strength in the radial direction, elasticity in axial direction, and endurance, and a loudspeaker using the same.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
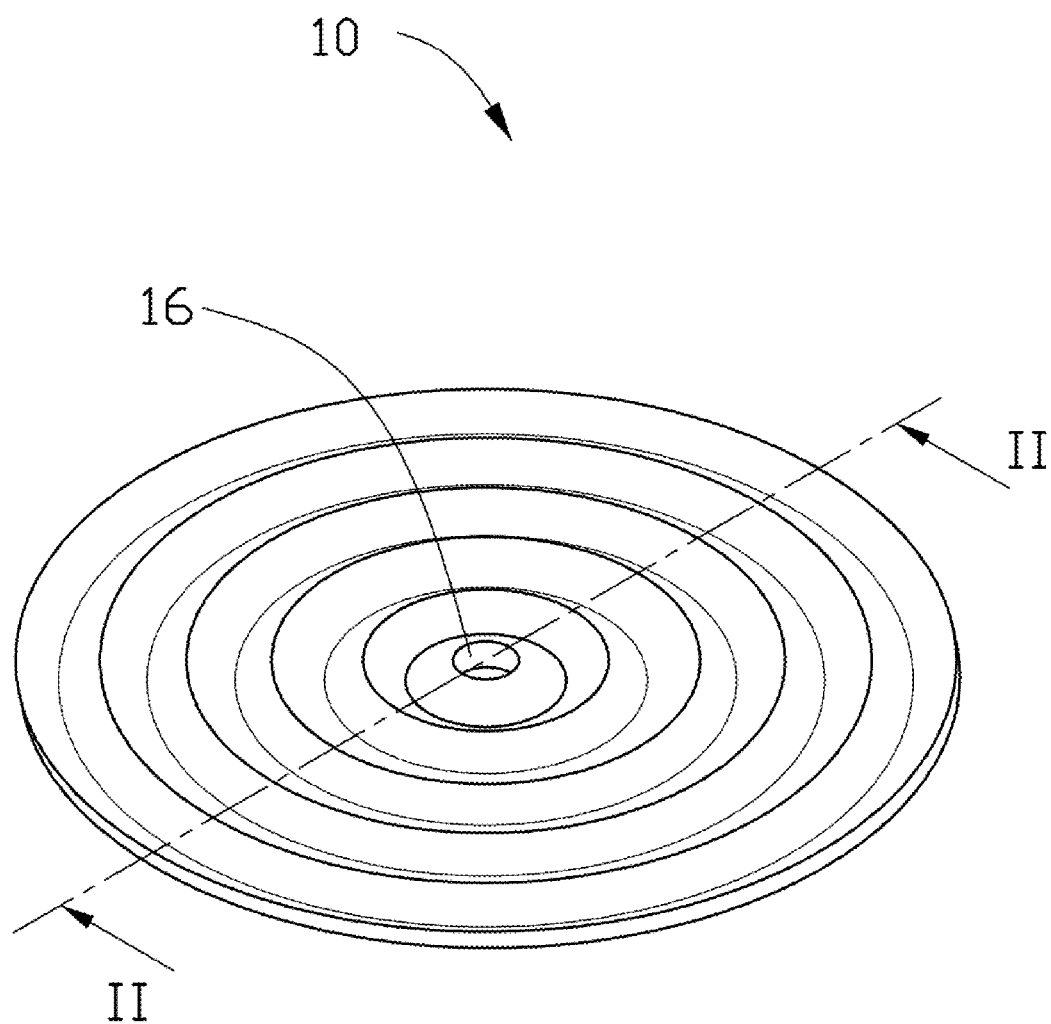
FIG. 1 is a schematic structural view of an embodiment of a damper.
Figure 2:
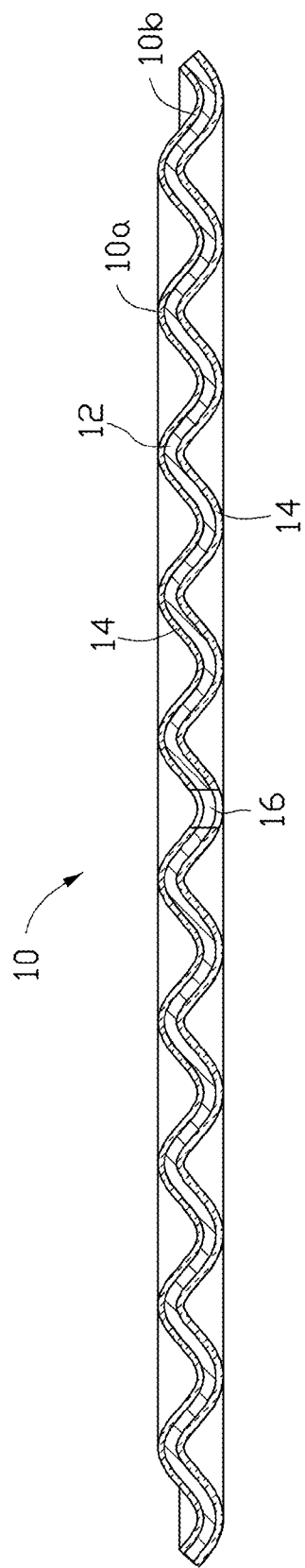
FIG. 2 is a cross-sectional view of the damper of FIG. 1, taken along line II-II.

Referring to FIG. 1, an embodiment of a damper 10 is shown. The shape and size of the damper 10 is not limited. The damper 10 can be fabricated into a sheet shape, or other shapes to adapt to the actual needs of a desired loudspeaker design. In the embodiment shown in FIG. 1, the damper 10 is in the form of an annular disk with a corrugated cutaway section as shown in FIG. 2. The damper 10 forms a plurality of alternating concentric peaks 10a and valleys 10b, thereby presenting the corrugated configuration.

The damper 10 comprises a matrix 12 and two layer-shaped carbon nanotube structures 14. The matrix 12 is interposed between the two layer-shaped carbon nanotube structures 14, thereby forming a multi-layer structure. A central hole 16 is defined through the matrix 12 and the two layer-shaped carbon nanotube structures 14. The shape and size of the central hole 16 corresponds to the shape and size of a bobbin or a voice coil of a loudspeaker, so that the damper 10 can be installed on the bobbin or the voice coil through the central hole 16.

The matrix 12 has good elasticity and high specific strength. The matrix 12 can be made of cloth, paper, cellulose membrane, or polymer film. For example, the matrix 12 can be a glass fiber cloth, kraft paper, polyethylene terephthalate membrane, polyimide membrane, polyphenylene ether acid membrane, polypropylene membrane, polystyrene membrane, polyvinyl chloride membrane, or polyether sulfone membrane.

Each of the layer-shaped carbon nanotube structures 14 can comprise at least one layer of carbon nanotube film disposed or wrapped around surfaces of the matrix 12 so as to form the damper 10. The carbon nanotube film can include a plurality of carbon nanotubes distributed therein, and the carbon nanotubes therein can be combined by van der Waals attractive force therebetween.

The carbon nanotubes in the carbon nanotube film can be orderly or disorderly arranged. The term 'disordered carbon nanotube structure' includes, but is not limited to, a structure where the carbon nanotubes are arranged along many different directions, such that the number of carbon nanotubes arranged along each different direction can be almost the same (e.g. uniformly disordered); and/or entangled with each other. 'Ordered carbon nanotube structure' includes, but is not limited to, a structure where the carbon nanotubes are arranged in a systematic manner, e.g., the carbon nanotubes are arranged approximately along a same direction and or have two or more sections within each of which the carbon nanotubes are arranged approximately along a same direction (different sections can have different directions). The carbon nanotubes in the carbon nanotube structure 14 can be single-walled, double-walled, and/or multi-walled carbon nanotubes. Diameters of the single-walled carbon nanotubes range from about 0.5 nanometers to about 50 nanometers. The diameters of the double-walled carbon nanotubes can range from about 1 nanometer to about 50 nanometers. The diameters of the multi-walled carbon nanotubes can range from about 1.5 nanometers to about 50 nanometers. The carbon nanotube film can be a drawn carbon nanotube film, a flocculated carbon nanotube film, or a pressed carbon nanotube film.

Drawn Carbon Nanotube Film

Figure 3:
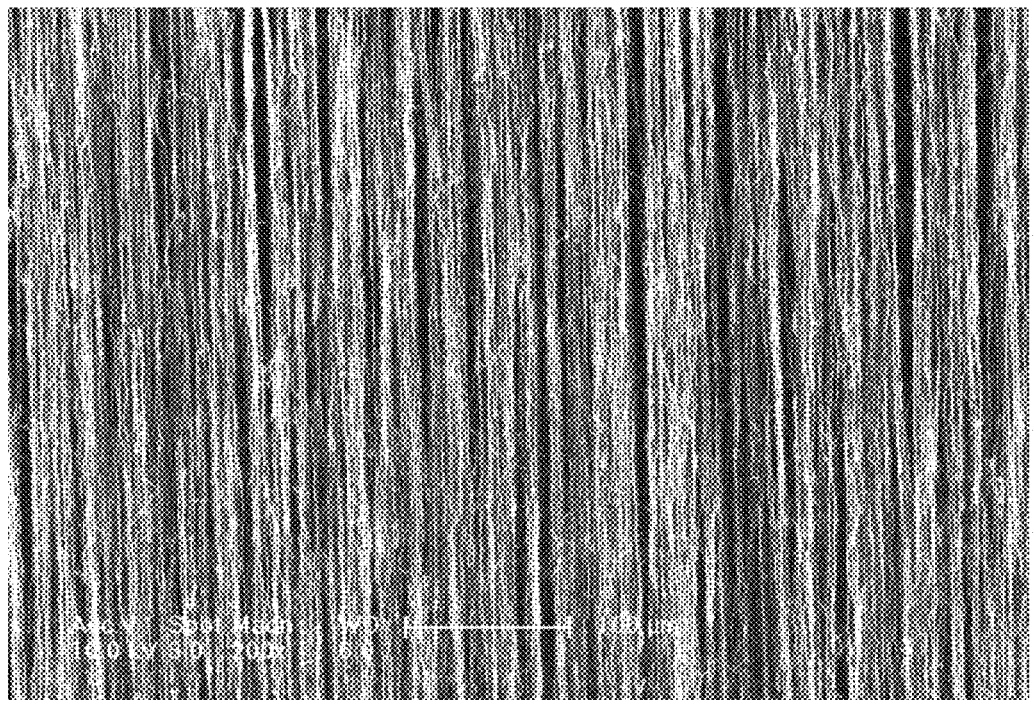
FIG. 3 shows a Scanning Electron Microscope (SEM) image of a drawn carbon nanotube film.
Figure 4:
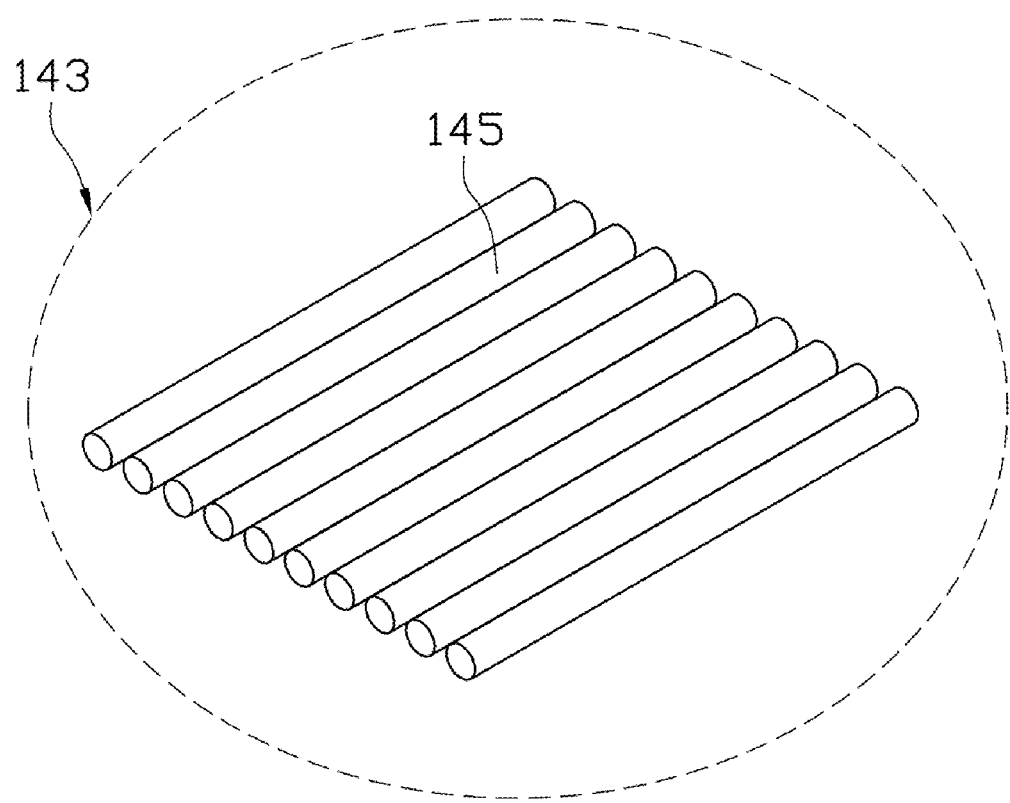
FIG. 4 is a schematic, enlarged view of a carbon nanotube segment in the drawn carbon nanotube film of FIG. 3.

In one embodiment, the carbon nanotube structure 14 can include at least one drawn carbon nanotube film. Examples of a drawn carbon nanotube film are taught by U.S. Pat. No. 7,045,108 to Jiang et al., and WO 2007015710 to Zhang et al. The drawn carbon nanotube film includes a plurality of successive and oriented carbon nanotubes joined end-to-end by van der Waals attractive force therebetween. The carbon nanotubes in the carbon nanotube film can be substantially aligned in a single direction. The drawn carbon nanotube film can be formed by drawing a film from a carbon nanotube array capable of having a film drawn therefrom. Referring to FIGS. 3 and 4, each drawn carbon nanotube film includes a plurality of successively oriented carbon nanotube segments 143 joined end-to-end by van der Waals attractive force therebetween. Each carbon nanotube segment 143 includes a plurality of carbon nanotubes 145 substantially parallel to each other, and combined by van der Waals attractive force therebetween. As can be seen in FIG. 3, some variations can occur in the drawn carbon nanotube film. The carbon nanotubes 145 in the drawn carbon nanotube film are also oriented along a preferred orientation.

The carbon nanotube structure 14 can also include at least two stacked drawn carbon nanotube films. In other embodiments, the carbon nanotube structure 14 can include two or more coplanar drawn carbon nanotube films. Coplanar drawn carbon nanotube films can also be stacked upon other coplanar films. Additionally, an angle can exist between the orientation of carbon nanotubes in adjacent drawn films, stacked and/or coplanar. Adjacent drawn carbon nanotube films can be combined by only the van der Waals attractive force therebetween without the need of an additional adhesive. An angle between the aligned directions of the carbon nanotubes in the two adjacent drawn carbon nanotube films can range from about 0 degrees to about 90 degrees. If the angle between the aligned directions of the carbon nanotubes in adjacent drawn carbon nanotube films is larger than 0 degrees, a microporous structure is defined by the carbon nanotubes. The carbon nanotube structure 14 in one embodiment employing these films will have a plurality of micropores. The sizes of the micropores can be less than about 10 μm.

Flocculated Carbon Nanotube Film

Figure 5:
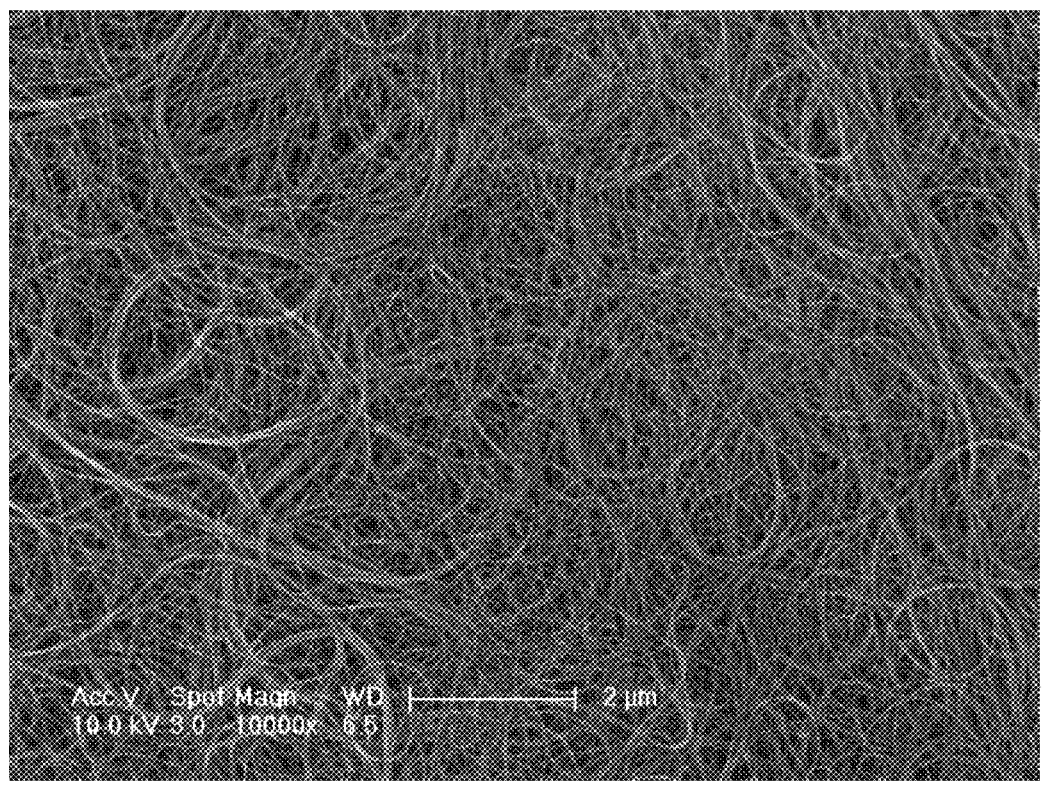
FIG. 5 shows an SEM image of a flocculated carbon nanotube film.

In other embodiments, the carbon nanotube structure 14 can include a flocculated carbon nanotube film. Referring to FIG. 5, the flocculated carbon nanotube film can include a plurality of long, curved, disordered carbon nanotubes entangled with each other. Further, the flocculated carbon nanotube film can be isotropic. The carbon nanotubes can be substantially uniformly dispersed in the carbon nanotube film. Adjacent carbon nanotubes are acted upon by van der Waals attractive force to obtain an entangled structure with micropores defined therein. It is understood that the flocculated carbon nanotube film is very porous. The sizes of the micropores can be less than about 10 μm. The porous nature of the flocculated carbon nanotube film will increase the specific surface area of the carbon nanotube structure. Because the carbon nanotubes in the carbon nanotube structure 14 are entangled with each other, the carbon nanotube structure 14 employing the flocculated carbon nanotube film has excellent durability, and can be fashioned into desired shapes with a low risk to the integrity of the carbon nanotube structure 14. The thickness of the flocculated carbon nanotube film can range from about 1 μm to about 1 mm.

Pressed Carbon Nanotube Film

Figure 6:
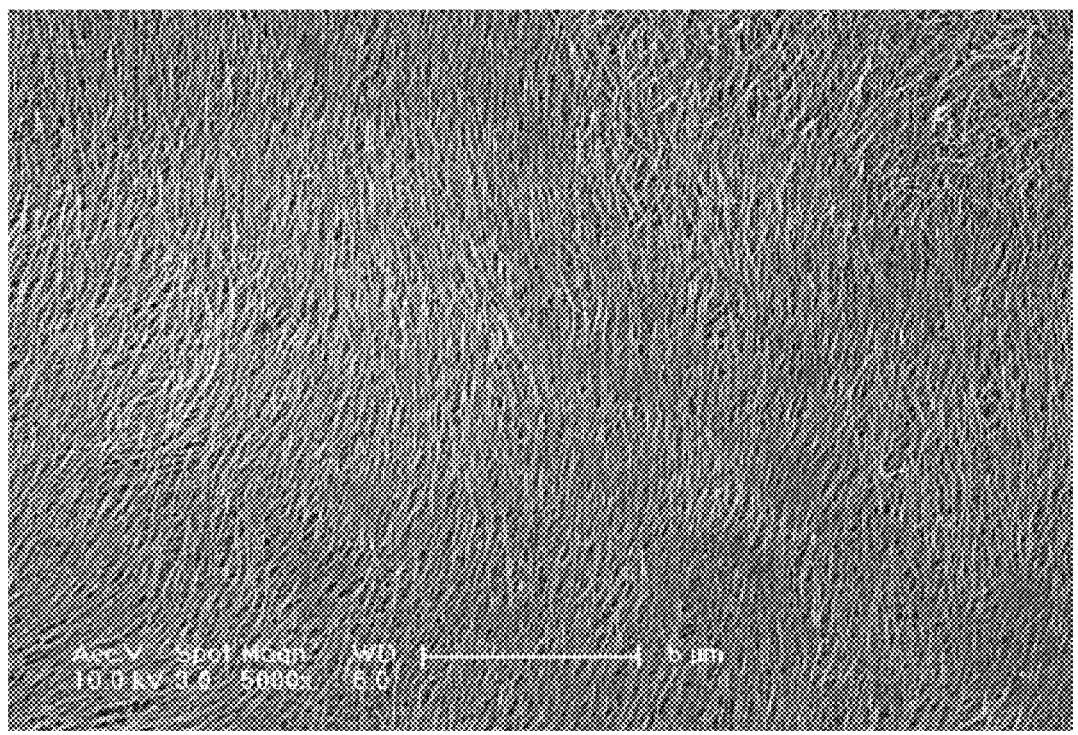
FIG. 6 shows an SEM image of a pressed carbon nanotube film.

In other embodiments, the carbon nanotube structure 14 can include at least a pressed carbon nanotube film. Referring to FIG. 6, the pressed carbon nanotube film can be a freestanding carbon nanotube film. The carbon nanotubes in the pressed carbon nanotube film can be arranged along a same direction or along different directions. The carbon nanotubes in the pressed carbon nanotube film can rest upon each other. Adjacent carbon nanotubes are attracted to each other and combined by van der Waals attractive force. An angle between a primary alignment direction of the carbon nanotubes and a surface of the pressed carbon nanotube film is about 0 degrees to approximately 15 degrees. The greater the pressure applied, the smaller the angle obtained. If the carbon nanotubes in the pressed carbon nanotube film are arranged along different directions, the carbon nanotube structure 14 can be isotropic. Here, "isotropic" means the carbon nanotube film has properties identical in all directions parallel to a surface of the carbon nanotube film. The thickness of the pressed carbon nanotube film can range from about 0.5 nm to about 1 mm. Examples of a pressed carbon nanotube film are taught by US PGPub. 20080299031A1 to Liu et al.

The carbon nanotube structures 14 and the matrix 12 can be combined together with adhesives or by hot pressing to form a three-layer structure. If the matrix 12 is made of metal, the adhesives can be silver glue. If the carbon nanotube structures 14 and the matrix 12 are combined together by hot pressing, at least some of the carbon nanotubes of the carbon nanotube structures 14 infiltrate into opposites surfaces of the matrix 12, and this can strengthen the bonding force between each of the carbon nanotube structures 14 and the matrix 12.

In one embodiment, if one of the two carbon nanotube structures 14 is omitted, then only one carbon nanotube structure 14 is disposed on one surface of the matrix 12. As a result, a two-layer structure is formed.

Figure 7:
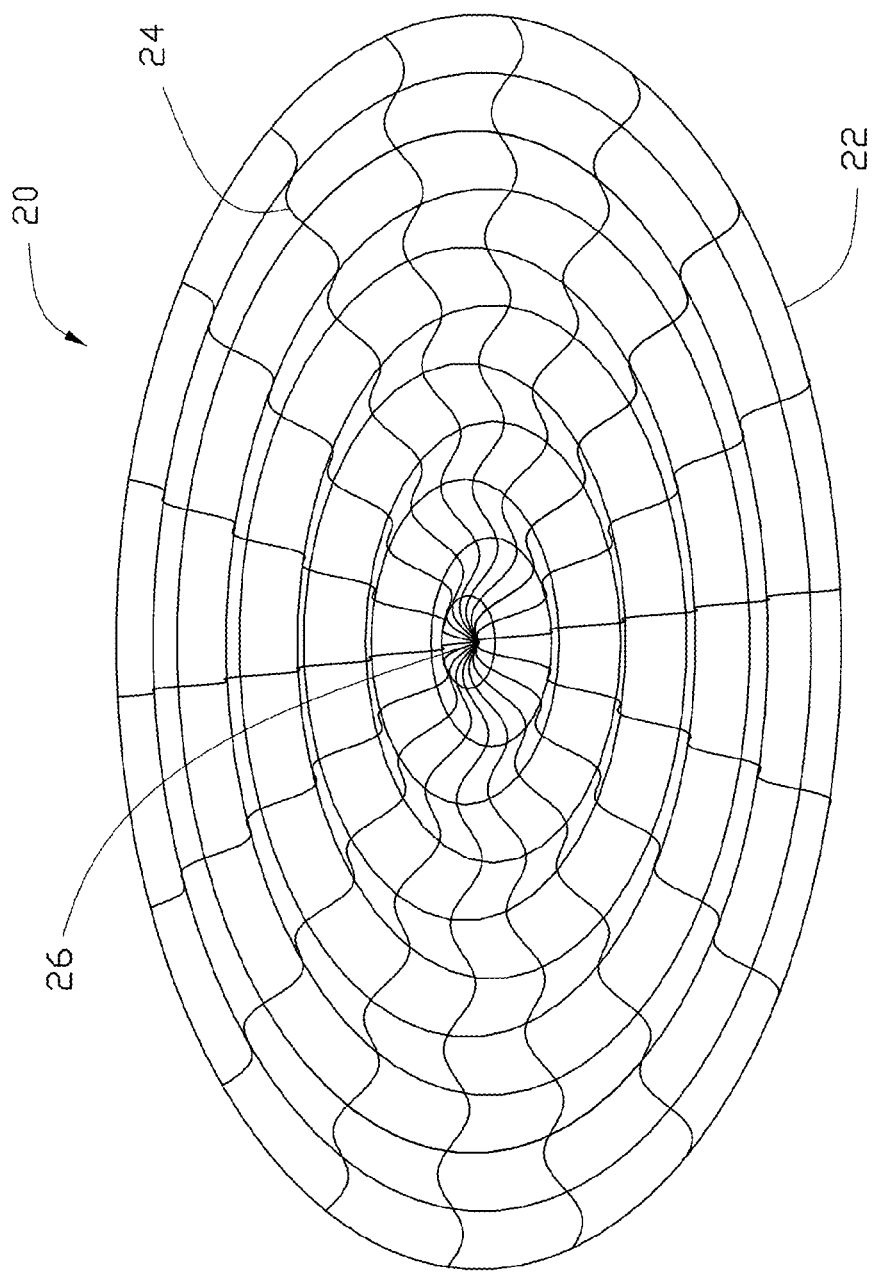
FIG. 7 is a schematic structural view of another embodiment of a damper.

FIG. 7 shows a schematic structural view of another embodiment of a damper 20 comprising a central hole 26, a matrix 22, and a carbon nanotube structure 24. The damper 20 is similar to the damper 10, except that the carbon nanotube structure 24 comprises at least one linear carbon nanotube structure arranged on the matrix 22.

In one embodiment, as shown in FIG. 7, the carbon nanotube structure 24 is a single linear carbon nanotube structure wound around the matrix 22 many times by extending the single linear carbon nanotube structure through the central hole 26 many times. On one surface of the matrix 22 shown in FIG. 7, the single linear carbon nanotube structure forms a plurality of sub-portions extending radially from the central hole 26 towards an outer periphery of the matrix 22.

In one embodiment, the carbon nanotube structure 24 comprises a plurality of linear carbon nanotube structures and the linear carbon nanotube structures are arranged radially on the matrix in the same or similar manner as that shown in the FIG. 7.

Linear Carbon Nanotube Structure

The linear carbon nanotube structure can include one or more carbon nanotube wires. The carbon nanotube wires in the linear carbon nanotube structure can be substantially parallel to each other to form a bundle-like structure or twisted with each other to form a twisted structure.

Figure 8:
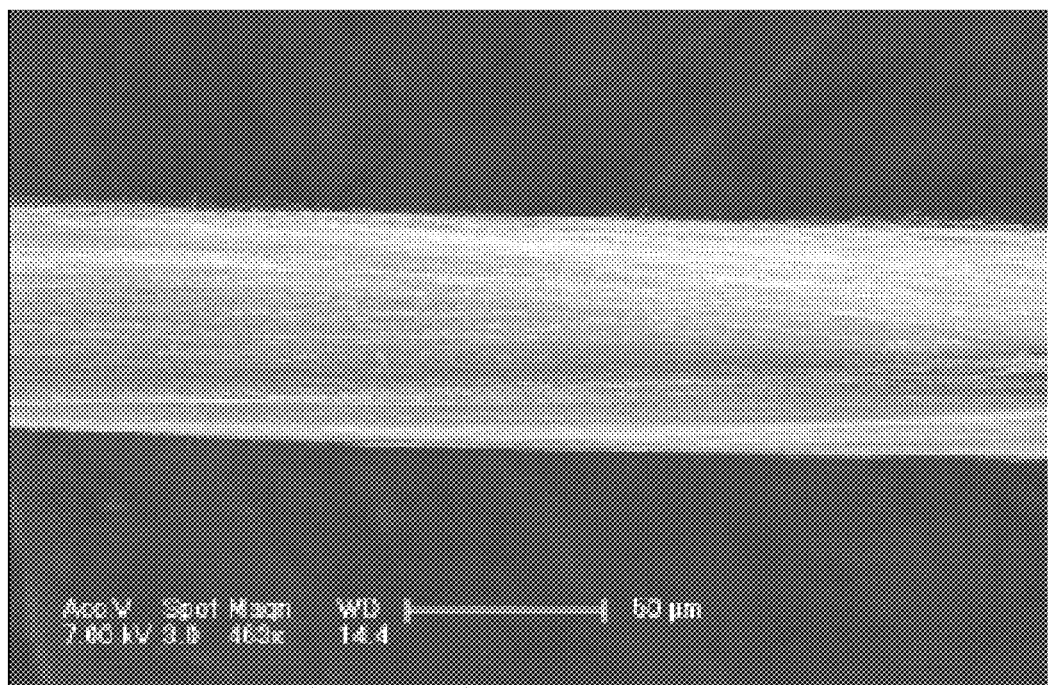
FIG. 8 is an SEM image of an untwisted carbon nanotube wire.

The carbon nanotube wire can be an untwisted carbon nanotube wire or a twisted carbon nanotube wire. An untwisted carbon nanotube wire is formed by treating a carbon nanotube film with an organic solvent. FIG. 8 shows an untwisted carbon nanotube wire including a plurality of successive carbon nanotubes substantially oriented along the linear direction of the untwisted carbon nanotube wire and joined end-to-end by van der Waals attraction force therebetween. The untwisted carbon nanotube wire can have a diameter ranging from about 0.5 nm to about 100 μm.

Figure 9:
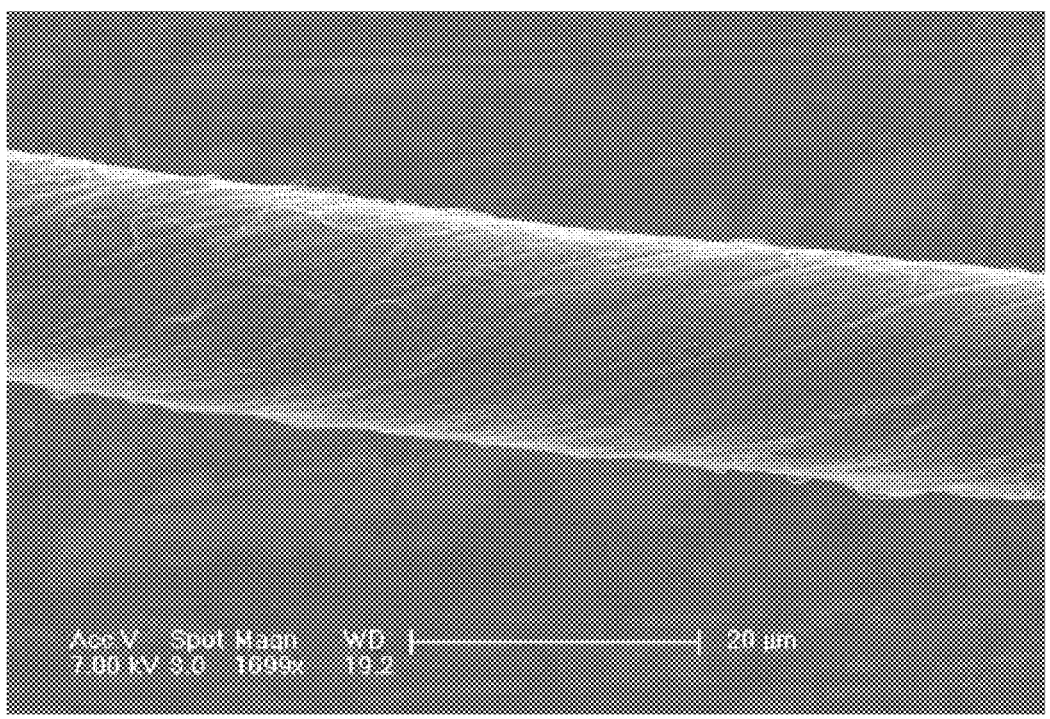
FIG. 9 is an SEM image of a twisted carbon nanotube wire.

A twisted carbon nanotube wire is formed by twisting a carbon nanotube film by using a mechanical force. FIG. 9 shows a twisted carbon nanotube wire including a plurality of carbon nanotubes oriented around an axial direction of the twisted carbon nanotube wire. The length of the twisted carbon nanotube wire can be set as desired and the diameter of the carbon nanotube wire can range from about 0.5 nanometers to about 100 micrometers. The twisted carbon nanotube wire can be treated with an organic solvent before or after twisting.

In the embodiment shown in FIG. 7, the linear carbon nanotube structure comprises three carbon nanotube wires twisted with each other to form a twisted structure.

It is noteworthy that the carbon nanotube structure 24 can include a plurality of carbon nanotube wires and a plurality of wires made of other materials. The plurality of carbon nanotube wires and the plurality of wires made of other materials can be crossed with each other or woven together. The other materials include polymer, paper, fiber, cloth, and metal.

Figure 10:
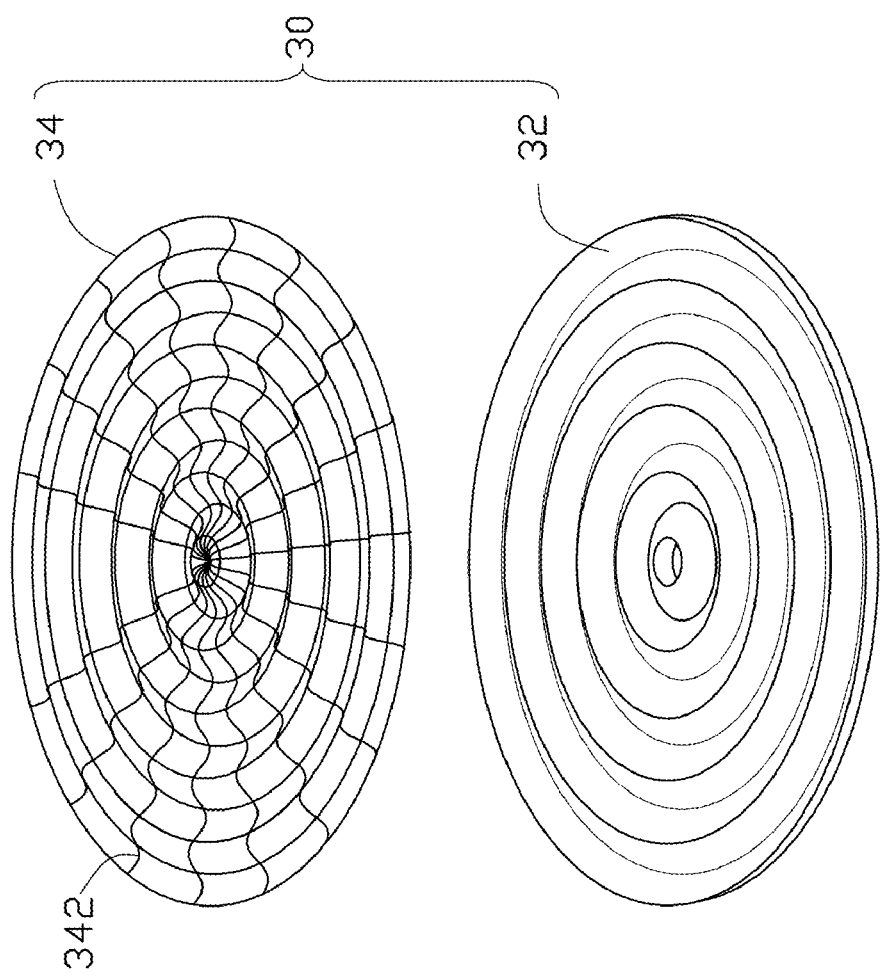
FIG. 10 is a schematic, exploded view of still another embodiment of a damper.

FIG. 10 shows a schematic structural view of another embodiment of a damper 30 comprising a matrix 32 and a carbon nanotube structure 34 disposed on a surface of the matrix 32. The damper 30 is similar to the damper 10, except that the damper 30 is a two-layer structure. The carbon nanotube structure 34 includes a plurality of linear carbon nanotube structures 342 substantially parallel with each other (not shown), crossed with each other, or woven together to obtain a layer-shaped carbon nanotube structure 34. The layer-shaped carbon nanotube structure 34 can be disposed on a surface of the matrix 32 with adhesives or by hot pressing. In the embodiment shown in FIG. 10, the linear carbon nanotube structures 342 are woven together and form a network which resembles the outer configuration of the matrix 32.

It is noteworthy that the carbon nanotube structure 34 can include a plurality of linear carbon nanotube structures 342 and a plurality of wires made of other materials. The plurality of linear carbon nanotube structures 342 and the plurality of wires made of other materials can be crossed with each other or woven together. The other materials include polymer, paper, fiber, cloth, and metal. It is also noteworthy that the damper 30 can further comprise another carbon nanotube structure 34 and the matrix 32 can be disposed between the two carbon nanotube structures 34.

Figure 11:
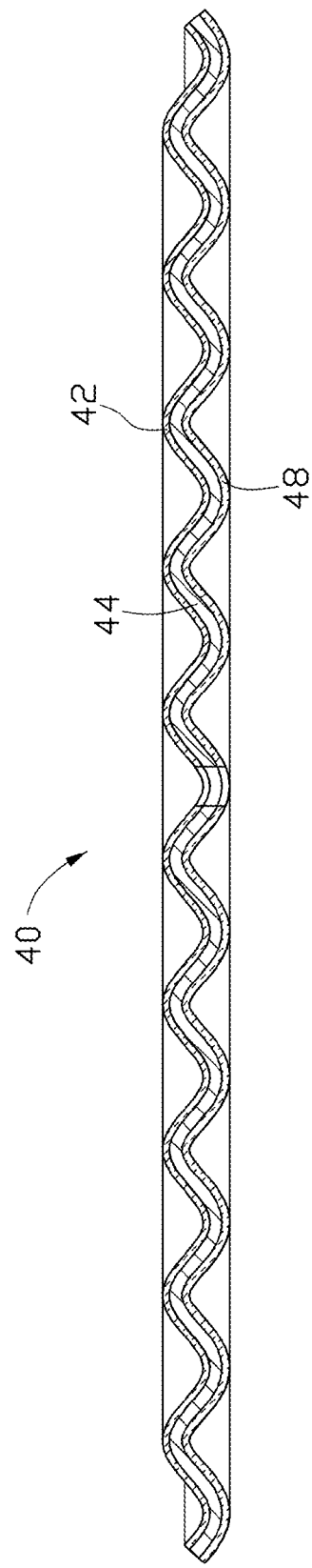
FIG. 11 is a schematic, cross-sectional view of still another embodiment of a damper.

FIG. 11 shows a schematic structural view of another embodiment of a damper 40 comprising a matrix 42 and a carbon nanotube structure 44. The damper 40 is similar to the damper 10, except that the damper 40 further comprises an enhancement layer 48, and the carbon nanotube structure 44 is sandwiched between the matrix 42 and the enhancement layer 48.

The carbon nanotube structure 44 can include at least one carbon nanotube film or at least one linear carbon nanotube structure discussed above. The carbon nanotube structure 44 can also be a combination of the at least one carbon nanotube film and the at least one linear carbon nanotube structure disposed on a surface of the at least one carbon nanotube film with adhesives or by hot pressing.

The enhancement layer 48 can be made of metal, paper, polymer, diamond, boron carbide, or ceramics. The enhancement layer 48 can be formed on one surface of the carbon nanotube structure 44 via a coating or depositing method. The enhancement layer 48 can enhance the bonding strength between the carbon nanotube structure 44 and the matrix 42. Materials of the enhancement layer 48 can be selected to have good binding ability with the matrix 42. For example, if the matrix 42 is made of metal, the enhancement layer 48 can be made of the same metal.

Figure 12:
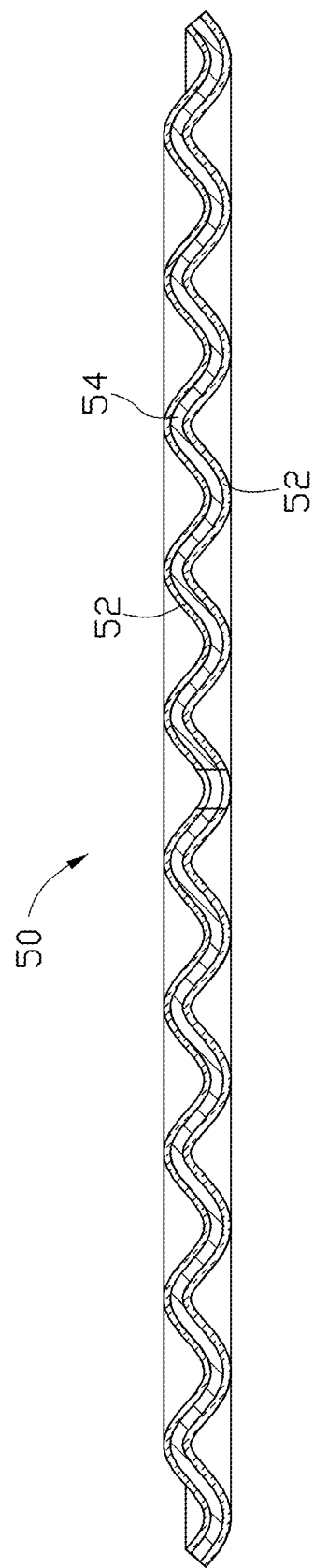
FIG. 12 is a schematic, cross-sectional view of yet another embodiment of a damper.

FIG. 12 shows a schematic structural view of another embodiment of a damper 50. The damper 50 is similar to the damper 10, except that the damper 50 comprises two matrixes 52 and a carbon nanotube structure 54. The carbon nanotube structure 54 is sandwiched between the two matrixes 52 to form a three-layer structure.

It is noteworthy that the damper 50 can include a plurality of matrixes and a plurality of carbon nanotube structures. The plurality of matrixes and the plurality of carbon nanotube structures can be stacked alternately, one on top of the other to form a multi-layer structure. It is also noteworthy that the damper 50 can further comprise an enhancement layer disposed on the carbon nanotube structure in the same or similar manner as that of the damper 40.

Figure 13:
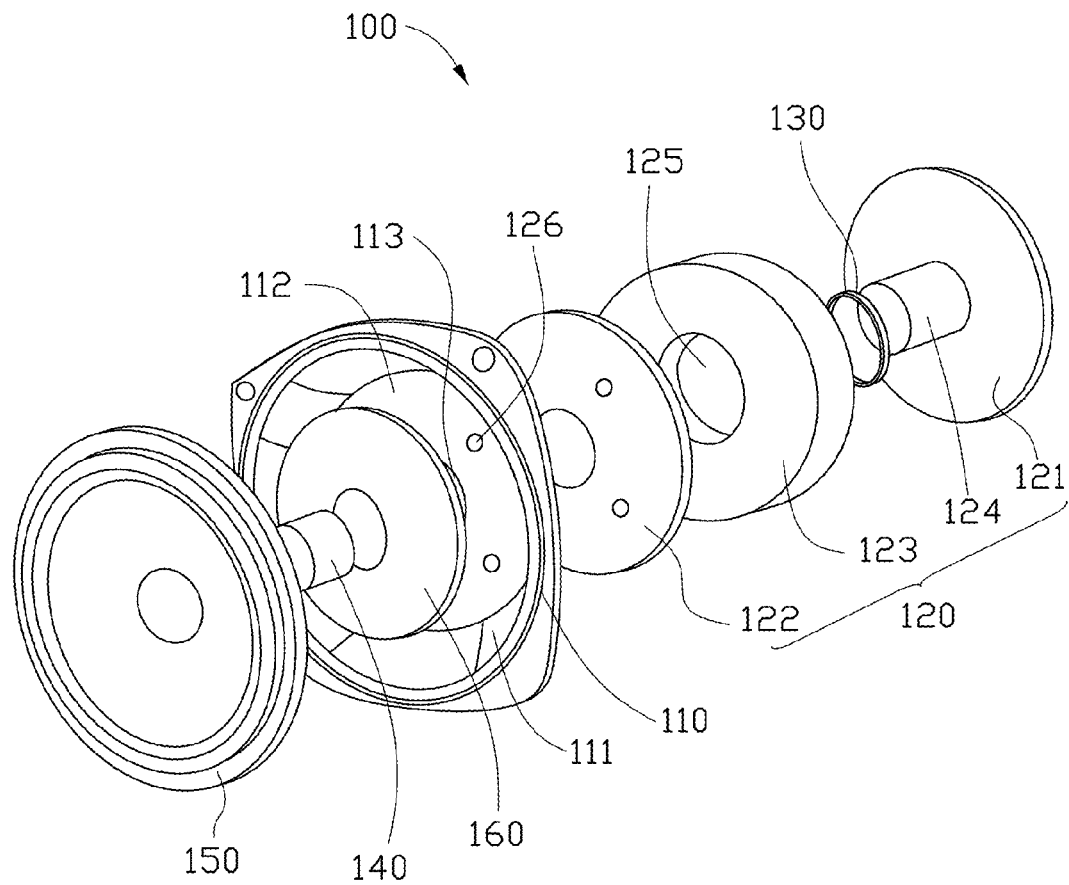
FIG. 13 is a schematic, exploded view of an embodiment of a loudspeaker.
Figure 14:
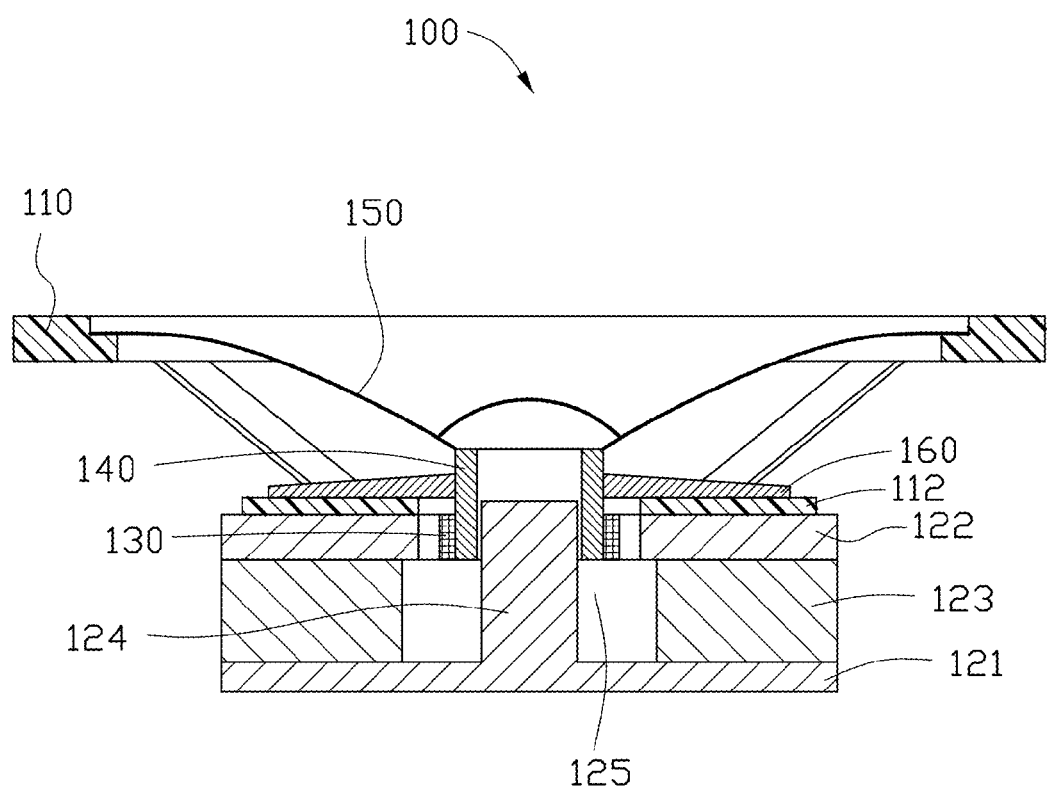
FIG. 14 is a schematic, cross-sectional view of the loudspeaker of FIG. 13 after being assembled.

Referring to FIGS. 13 and 14, a loudspeaker 100 of one embodiment is shown. The loudspeaker 100 includes a frame 110, a magnetic circuit 120, a voice coil 130, a voice coil bobbin 140, a diaphragm 150 and a damper 160. The damper 160 can be one of the above dampers 10, 20, 30, 40, 50.

The frame 110 has a structure of a truncated cone with an opening (not labeled) on one end. The frame 110 has a bottom 112 and a hollow cavity 111. The hollow cavity 111 receives the diaphragm 150 and the damper 160. The bottom 112 has a center hole 113. The bottom 112 of the frame 110 is fixed to the magnetic circuit 120.

The magnetic circuit 120 includes a lower plate 121, an upper plate 122, a magnet 123, and a magnet core 124. The magnet 123 is disposed between the upper plate 122 and the lower plate 121. The upper plate 122 and the magnet 123 are both substantially ring shaped, and define a substantially cylindrical shaped magnetic gap 125 in the magnetic circuit 120. The magnet core 124 is fixed on the lower plate 121, is received in the magnetic gap 125, and goes through the center hole 113 of the bottom 112. The magnetic circuit 120 is fixed on the bottom 112 via the upper plate 122. The upper plate 122 can be combined with the bottom 112 via adhesive or mechanical force. In one embodiment according to FIG. 13, the upper plate 122 is fixed on the bottom 112 by screws (not shown) via screw holes 126.

The diaphragm 150 is a sound producing member of the loudspeaker 100. The diaphragm 150 can have a cone shape if used in a large sized loudspeaker 100. If the loudspeaker 100 has a smaller size, the diaphragm 150 can have a planar circular shape or a planar rectangular shape. A material of the diaphragm 150 can be aluminum alloy, magnesium alloy, ceramic, fiber, or cloth. In one embodiment according to FIG. 13, the diaphragm 150 has a conical shape. The diaphragm 150 includes an outer rim (not labeled) and an inner rim (not labeled). The outer rim of the diaphragm 150 is fixed to the opening end of the frame 110, and the inner rim of the diaphragm 150 is fixed to the voice coil bobbin 140. Furthermore, an external input terminal (not shown) can be attached to the frame 110. A dust cap can be fixed over and above a joint portion of the diaphragm 150 and the voice coil bobbin 140.

The damper 160 holds the diaphragm 150 mechanically. The damper 160 is fixed to the bottom 112 of the frame 110. An inner rim of the damper 160 is connected with the voice coil bobbin 140. The damper 160 has a relatively high rigidity along the radial direction thereof, and a relatively low rigidity along the axial direction thereof, thus the voice coil bobbin 140 can freely move up and down but not radially.

The voice coil 130 is a driving member of the loudspeaker 100. The voice coil 130 is disposed around an outer surface of the bobbin 140. When an electric signal is inputted into the voice coil 130, a magnetic field is formed by the voice coil 130 as the variation of the electric signals. The interaction of the magnetic field caused by the voice coil 130 and the magnetic circuit 120 produces the vibration of the voice coil 130. The vibration of the voice coil 130 would make the voice coil bobbin 140 vibrate, and accordingly the diaphragm 150 fixed on the voice coil bobbin 140 will vibrate. The vibration of the diaphragm 150 causes the loudspeaker 100 to produce sound.

According to the above descriptions, the damper of present disclosure has following advantages.

(1) Because the carbon nanotubes provided in the damper have good strength and elasticity, the carbon nanotube structure provided in the damper can improve the strength and the elasticity of the damper. The damper can prevent the voice coil from making unfavorable movement, even if excessive vibration is applied to the voice coil. Therefore, the sound volume of the loudspeaker using the damper can be increased.

(2) The carbon nanotube structure decreases the weight of the damper under the same volume.

It is to be understood that the above-described embodiments are intended to illustrate rather than limit the disclosure. Any elements described in accordance with any embodiments is understood that they can be used in addition or substituted in other embodiments. Embodiments can also be used together. Variations may be made to the embodiments without departing from the spirit of the disclosure. The above-described embodiments illustrate the scope of the disclosure but do not restrict the scope of the disclosure.

What is claimed is:

1. A damper comprising:
   at least one matrix;
   at least one carbon nanotube structure disposed on at least one surface of the at least one matrix; and
   a hole defined through the at least one matrix and the at least one carbon nanotube structure.

2. The damper of claim 1, wherein the at least one matrix comprises two matrixes, and the at least one carbon nanotube structure is disposed between the two matrixes.

3. The damper of claim 1, wherein the at least one carbon nanotube structure comprises two carbon nanotube structures and the at least one matrix is disposed between the two carbon nanotube structures.

4. The damper of claim 1, wherein the at least one matrix comprises a plurality of matrixes, and the at least one carbon nanotube structure comprises a plurality of carbon nanotube structures, the plurality of matrixes and the plurality of carbon nanotube structures being stacked alternately on top of the other.

5. The damper of claim 1, further comprising an enhancement layer, wherein the at least one carbon nanotube structure is sandwiched between the at least one matrix and the enhancement layer.

6. The damper of claim 1, wherein the at least one matrix forms a plurality of alternating concentric peaks and valleys, and the at least one carbon nanotube structure is disposed on an outer portion of the at least one matrix.

7. The damper of claim 6, wherein the at least one carbon nanotube structure comprises a plurality of linear carbon nanotube structures forming a network.

8. The damper of claim 1, wherein the at least one carbon nanotube structure comprises at least one carbon nanotube film, at least one linear carbon nanotube structure, or a combination of the at least one carbon nanotube film and the at least one linear carbon nanotube structure.

9. The damper of claim 8, wherein the at least one carbon nanotube film is a drawn carbon nanotube film, a flocculated carbon nanotube film, or a pressed carbon nanotube film.

10. The damper of claim 8, wherein the at least one carbon nanotube structure comprises a plurality of carbon nanotube films stacked together or coplanarly arranged.

11. The damper of claim 8, wherein the at least one carbon nanotube structure is a single linear carbon nanotube structure winding around the at least one matrix by extending the single linear carbon nanotube structure through the at least one matrix many times.

12. The damper of claim 8, wherein the at least one carbon nanotube structure comprises a plurality of linear carbon nanotube structures arranged radially on the at least one matrix.

13. A loudspeaker comprising:
   a frame;
   a diaphragm secured on the frame;
   a bobbin having a voice coil and secured to the diaphragm; and
   a damper having a first engaging surface in engagement with the frame and a second engaging surface in engagement with the bobbin;
   wherein the damper comprises at least one matrix and at least one carbon nanotube structure disposed on at least one surface of the at least one matrix.

14. The loudspeaker of claim 13, wherein the damper further comprises a hole defined through the at least one matrix and the at least one carbon nanotube structure; the first engaging surface is an outer surface of the damper, and the second engaging surface is a surface defining the hole.

15. The loudspeaker of claim 14, wherein the at least one matrix forms a plurality of alternating concentric peaks and valleys, the at least one carbon nanotube structure is disposed on an outer portion of the at least one matrix, and the hole is at a center of the at least one matrix.

16. The loudspeaker of claim 15, wherein the at least one matrix comprises two matrixes, and the at least one carbon nanotube structure is disposed between the two matrixes.

17. The loudspeaker of claim 15, wherein the at least one carbon nanotube structure comprises two carbon nanotube structures and the at least one matrix is disposed between the two carbon nanotube structures.

18. The loudspeaker of claim 15, wherein the at least one matrix comprises a plurality of matrixes, and the at least one carbon nanotube structure comprises a plurality of carbon nanotube structures, the plurality of matrixes and the plurality of carbon nanotube structures being stacked alternately on top of the other.

19. The loudspeaker of claim 15, wherein the damper further comprises an enhancement layer, and the at least one carbon nanotube structure is sandwiched between the at least one matrix and the enhancement layer.

20. A damper comprising:
   at least one layer of matrix;
   at least one layer of carbon nanotube structure disposed on at least one surface of the at least one layer of matrix;
   a first engaging surface formed at one end of the at least one layer of matrix; and
   a second engaging surface formed at another end of the at least one layer of matrix.

* * * * *